US011531560B2

(12) United States Patent
Maxilom et al.

(10) Patent No.: US 11,531,560 B2
(45) Date of Patent: Dec. 20, 2022

(54) SYSTEM AND METHOD FOR MAINTAINING SYNCHRONIZATION BETWEEN AN ENTERPRISE SYSTEM AND A REMOTE SERVICE SUPPORT PORTAL

(71) Applicant: NCR Corporation, Duluth, GA (US)

(72) Inventors: Chario Bardoquillo Maxilom, Ibabao Cordova (PH); Clem Paradero Pepito, Cebu (PH); Stanley Reginald Sanchez, III, Mandaue (PH)

(73) Assignee: NCR Corporation, Atlanta, GA (US)

(*) Notice: Subject to any disclaimer, the term of this patent is extended or adjusted under 35 U.S.C. 154(b) by 369 days.

(21) Appl. No.: 16/022,997

(22) Filed: Jun. 29, 2018

(65) Prior Publication Data
US 2020/0004566 A1    Jan. 2, 2020

(51) Int. Cl.
*G06F 9/455* (2018.01)
*G06F 9/445* (2018.01)

(52) U.S. Cl.
CPC ........... *G06F 9/4555* (2013.01); *G06F 9/445* (2013.01); *G06F 9/45558* (2013.01); *G06F 2009/45562* (2013.01)

(58) Field of Classification Search
CPC .. G06F 9/445; G06F 9/44505; G06F 9/44536; G06F 9/4555; G06F 9/45558; G06F 2009/45562; G06F 8/71
See application file for complete search history.

(56) References Cited

U.S. PATENT DOCUMENTS

| | | | | |
|---|---|---|---|---|
| 7,185,066 | B2 * | 2/2007 | Noble | G06F 21/6218 707/999.009 |
| 8,301,994 | B1 * | 10/2012 | Shah | G06F 16/27 715/229 |
| 8,516,480 | B1 * | 8/2013 | Epstein | G06F 9/45558 718/1 |
| 8,825,611 | B1 * | 9/2014 | Jorgensen | G06F 21/6218 707/694 |
| 2005/0216441 | A1 * | 9/2005 | Thomas | G06F 16/275 |
| 2006/0200583 | A1 * | 9/2006 | Le Lann | G06F 16/958 707/E17.116 |
| 2008/0209409 | A1 * | 8/2008 | Van Riel | G06F 8/60 717/168 |
| 2013/0111596 | A1 * | 5/2013 | Rayes | H04L 63/0414 726/26 |
| 2013/0346803 | A1 * | 12/2013 | Chiruvolu | G06F 11/3688 714/37 |
| 2017/0214701 | A1 * | 7/2017 | Hasan | H04L 63/1491 |

* cited by examiner

*Primary Examiner* — Meng Ai T An
*Assistant Examiner* — Willy W Huaracha
(74) *Attorney, Agent, or Firm* — Schwegman, Lundberg & Woessner

(57) ABSTRACT

An agent and a configuration interface permit custom-level customizations for synchronizing a replica of an enterprise system over a network connection with a replicator. The replicator produces the replica as a Virtual Machine (VM) that is maintained on a portal server that is remote from an enterprise server that hosts the enterprise system.

18 Claims, 4 Drawing Sheets

SYSTEM AND METHOD FOR MAINTAINING SYNCHRONIZATION BETWEEN AN ENTERPRISE SYSTEM AND A REMOTE SERVICE SUPPORT PORTAL

BACKGROUND

Most, if not all, enterprises maintain an online presence and provide services to their customers. The majority of these enterprises are not related in any way to software and/or hardware products (technology). As a result, rather than maintaining a significant amount of software developers and technical support staff, these enterprises outsource most of their maintenance and support for their services. This has the benefit of allowing each enterprise to focus their capital and expenditures on their core customer strengths while maintaining a reduced technical support staff.

In many cases, the enterprises also license their software from third-party vendors and customize the third-party products to meet the needs of each enterprise. However, the enterprises still desire to maintain control over their own customer and internal data that is accessible from their online services (both internal employee online access and customer-facing online access). Consequently, the enterprises often host their online services and house their own data assets at one or more enterprise sites. Data assets are particularly important to the enterprises and are subject to many privacy rights provided to their customers and significant government compliance regulations. Additionally, data assets often comprise Intellectual Property of the enterprises, such as trade secrets.

Problems arise, however, when the enterprise online services (both internal to employees and/or external provided to customers) experience failures, unexpected results, and/or are in need of updates/patches. When this happens, the third-party licensed products often come with support agreements where third-party support staff provides support for the products. The products are usually substantially customized by each of the enterprises, which means that unless the failures are systemic and related to the base licensed product, the third-party support staff needs access to the hosted site that is internal to the enterprises. There are time delays and confidentiality issues associated with such a situation and the enterprises are reticent to provided unfettered access to their sites having their data assets.

In some cases, the third-party support staff is able to remotely access the enterprise site servers and capture a replica of the third-party vendors' products with the existing enterprise personalized customizations. However, this also takes a substantial amount of time, especially when the data transfer is voluminous. In this case, network bandwidth to the enterprise site server is degraded and the third-party products may be offline during the transfer. The live online third-party product is usually not modified in real time by the third-party support staff because this creates too many risks associated with corruption of or missing portions of live data assets being captured in the online product.

Consequently, improved third-party software support is needed that permits only an enterprise-desired amount of risk and that substantially improves the support time to resolve and/or perform support and maintenance activities.

SUMMARY

In various embodiments, methods and a system for system support replication are presented.

According to an embodiment, a method for system support replication is presented. Specifically, and in one embodiment, a configuration interface is provided and custom-data synchronization selections for an enterprise system are received from the configuration interface. Next, replica data for the enterprise system that comports with the custom-data synchronization selections are sent to a portal over a network connection. Synchronization between the enterprise system with the portal is maintained during operation of the enterprise system.

DETAILED DESCRIPTION

Figure 1:
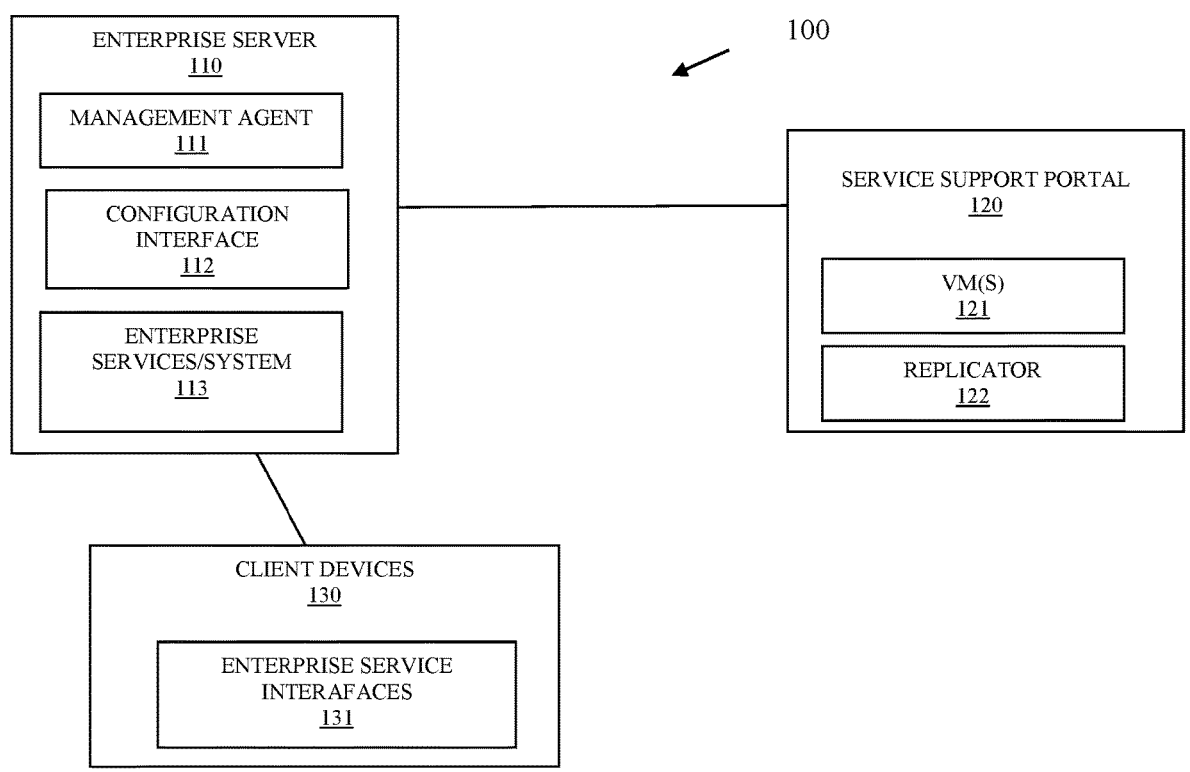
FIG. 1 is a diagram of a system for system support replication, according to an example embodiment.

FIG. 1 is a diagram of a system 100 for system support replication, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of system support replication, presented herein and below.

The system 100 includes enterprise server 110 (situated at enterprise controlled locations). The server 110 includes a novel management agent 111, a configuration interface 112, and a plurality of enterprise services 113 (also referred to herein as "enterprise system 113"). The system 100 further includes a remote service support portal 120 (server or cloud server 120) having one more dynamically maintained Virtual Machines (VMs) 121, and a replicator 122. Moreover, the system 100 includes a plurality of client devices 130 having enterprise service interfaces 131.

The client devices 130 can include: phones, tablets, laptops, desktops, Self-Service Terminals (SST), Point-Of-Sale (POS) terminals, desktops, servers, wearable processing devices, and the like.

The enterprise server 110 can include a collection of servers operating as a single server, such as a cloud that is internal to the enterprise sites and located at the enterprise sites.

The remote service support portal 120 is a third-party vender of some or all of the enterprise services/system 113. The portal 120 is external to any enterprise site location and may be a cloud-based server and provides remote network-based software and support for the enterprise services/system 113.

The VMs 121 represent a replica of some, but maybe not all, of the enterprise system 113 that is remotely maintained and synchronized by the replicator 122 in cooperation with the management agent 111. The VMs 121 does include a "true" replica of the base Operating System (OS) and core system configurations of the processing environment associated with the enterprise system 113, which may or may not be the same as the enterprise server 110 (may not be when the enterprise system 113 is itself a VM on the enterprise server 110 and is when the enterprise system 113 share the same processing environment as the enterprise server 110.

The degree of replication (the degree of duplication or sameness) between the enterprise system 113 and the VM 121 is entirely controlled by the enterprise through the direction of enterprise staff and customizations provided through the configuration interface 112. That is, the degree of replication is enterprise-directed and controlled. This means that the enterprise can decide on which data assets that are shared in the VM. In some cases, when a particular data asset, such as by way of example only, the enterprise's employee database, is not shared in the VM maintained by the replicator 122, the VM 121 will still reflect the existence of the employee database but the data populated therein is null or is dummy/faked and not true and accurate data. This provides a true view of the enterprise system 113 but not a true replica of the enterprise system 113 since the employee database is not replicated to the VM 113.

So, the level of risk that an enterprise is willing to accept with the third-party support staff can be controlled by the enterprise defining the level or degree of shared data between the enterprise system 100 and the VM 113.

The configuration interface 112 provides an enterprise-controlled level of customization for the VM 121 maintained at the portal 120. The configuration interface 112 provides a listing of data assets generated by the management agent along with checked selection boxes that by default include auto synchronization from the enterprise system 113 of: software version level, system configuration, and synchronization logs. The unchecked boxes for auto synchronization of the databases, transaction logs, item, departments, tenders, and promotions. The defaults can be changed within the configuration interface 112 by enterprise personnel. Furthermore, additional detected data for the database can be listed with unchecked boxes for the customer to check or uncheck, such as specific tables within the database and specific logs. The management agent 111 provides a complete listing of data assets and sub-level information for some data assets, such as database tables within a database. The enterprise personnel then checks or unchecks the desired level of synchronization between those data assets housed in the enterprise system 113 and the VM 121.

After the configuration is achieved through the configuration interface 112, the enterprise personnel can initiate the management agent to perform an online secure replication of the system 113 with synchronization of the data assets as defined in the configuration interface 112.

The management agent 111 initiates an online secure session between the server 110 and the portal 120 for providing the replica data to the replicator 122. The replicator 122 constructs the VM 121 on the portal 120. During operation of the system 110 as changes are made they are pushed over a secure connection to the replicator 122 and the VM 121 is dynamically and in real time synchronized. However, only those data assets that were listed as being synchronized and shared are provided from the management agent 111 to the replicator 122.

When a support operation (such as a patch to an enterprise service, a fix to an enterprise service, an upgrade to an enterprise service, installation of a new service, or an investigation into a remoted error or performance problem) is needed by support personnel of the portal 120 for the enterprise system 113, the support personnel access the VM 121 and performs the support operation entirely offline from and in an isolated environment from the online enterprise system 113. This permits testing and debugging of the support operation before the support operation is performed on the enterprise system 113. The support operation is jailed and isolated when performed in the VM 121 by the support personnel, meaning there is no risk of affecting the online enterprise system 113. Once the support personnel is confident of the support operation, the support operation can be scheduled for performance on the enterprise system 113.

The VM 121 provides an accurate reflection within a same processing environment as the enterprise system 113, which means testing and debugging on the VM 121 is nearly equivalent to testing and debugging on the online enterprise system 113. As a result, support resolution is enhanced and support accuracy is improved over existing techniques. Furthermore, the level of risk of exposing data assets of an enterprise is entirely controlled by the enterprise through the configuration interface 112.

As testing and changes are made on the VM 121, the VM may become out-of-synch with the enterprise system 113. In such cases, the support personnel can access a user-facing interface associated with the replicator 122 and dynamically push a re-synchronization request to the management agent 111. The management agent 111 re-initiates the replication process and a new VM 121 is created on the portal 120 for the enterprise system 113. In this way, there can be multiple instances of the enterprise system 113 on the portal at any given point in time. This may be useful when one support personnel is investigating the effects of a substantial enterprise services upgrade while another support personnel is investigating a performance problem with one of the enterprise services. Each support personnel can work on his/her own version of the enterprise system 113 in isolation from the work of the other support personnel. In such an embodiment, the management agent 111 can provide synchronization to both VMs 121 of the portal 120.

In an embodiment, the management agent 111 and configuration interface 112 are packaged and bundled with the software images of the enterprise services that comprise the enterprise system. So, when the enterprise services are installed as an enterprise system 113 at a server 110, the configuration interface 112 is initiated for customizations of data-level synchronization during initial startup and the management agent 111 is activated.

Furthermore, the management agent 111 can initiate a re-synchronization or replica operation that produces a new version of the VM 121. This can be achieved when the enterprise desires to start a new VM for whatever reason (perhaps some additional software or freeware was installed). Here, the management agent 111 interacts with the replica 122 to create the new VM 121 and once completed, the replica 122 may or may not delete the previous version of the VM 122 (this can be directed by the enterprise through the configuration interface 112.

In still another embodiment, the configuration interface 111 may provide a listing of the VMs 121 as well as version numbers or dates of initial creation in a VM listing view within the configuration interface 111. The enterprise personnel has control over deleting or maintaining multiple versions, and/or deleting all versions and initiating a new replica synchronization command for a new VM 121.

In an embodiment, the management agent 111 only has to send changes associated with enterprise-directed data asset synchronizations once over the network connection to the replicator 122, the replicator 122 manages each available VM 121 and provides the appropriate updates to the VMs 121.

In an embodiment, the enterprise can maintain multiple VMs 121 with each VM 121 having a different degree or level of data asset sharing. Again, the configuration interface 112 can be used for each custom VM 121. For instance, the promotions and transaction database tables may be shared and synchronized in a first version of a VM 121 whereas the promotions and transaction database tables are not shared and not synchronized in a second version of the VM 121.

In an embodiment, the configuration interface 112 also provides an option for synchronizing the enterprise system 113 with custom configurations on multiple different machines. A first machine including the portal 120 and a second or more machines that are not associated with the portal 120. In the case of the second or more machines, the replicator 122 must have network access to create the additional VMs 121 on those machines over a network connection and/or those machines have their own executing instance of the replicator 122 such that the additional VMs 121 can be created on those additional machines that are located outside of the portal 120.

These and other embodiments are now discussed with reference to the FIGS. 2-4.

Figure 2:
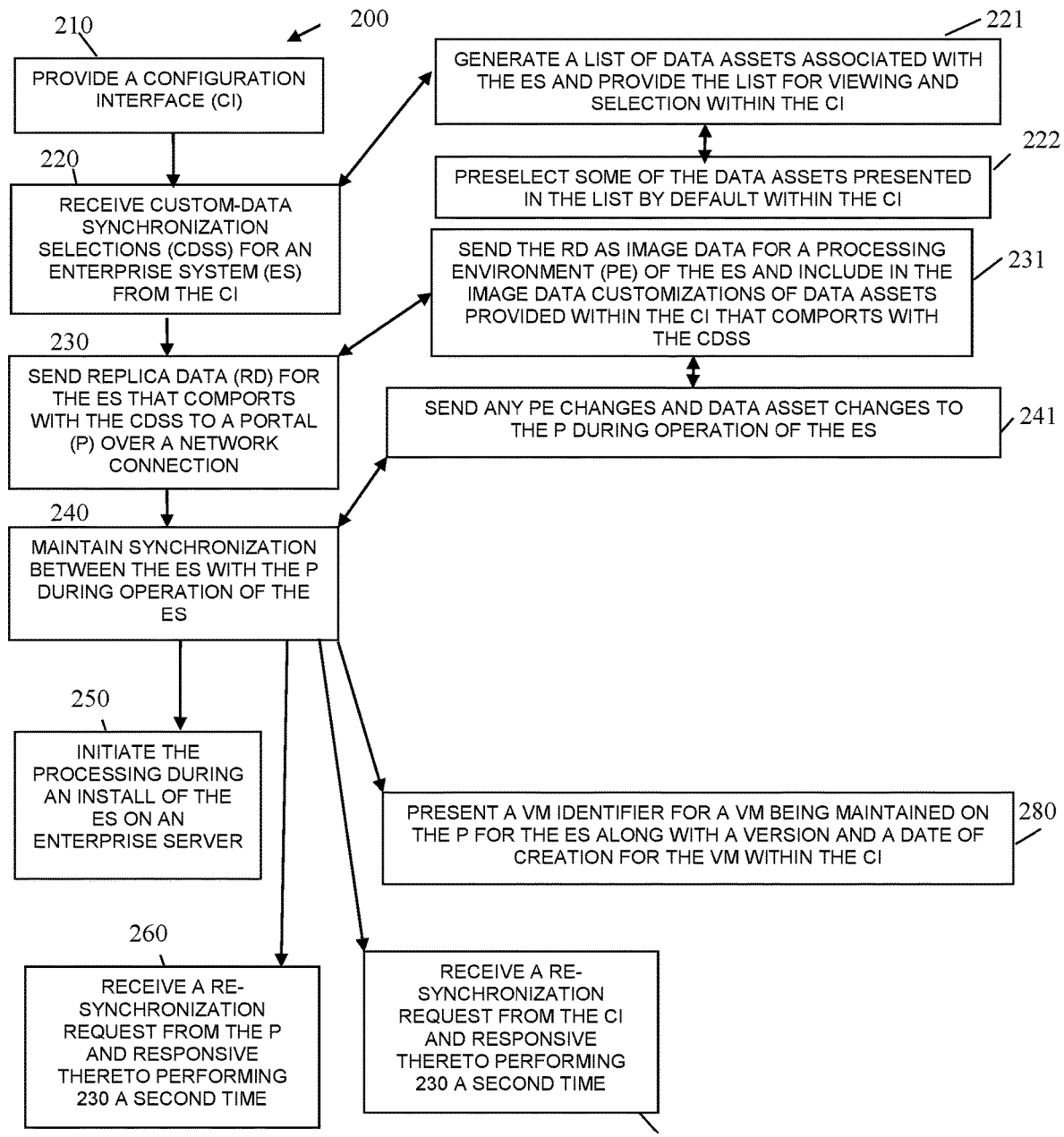
FIG. 2 is a diagram of a method for system support replication, according to an example embodiment.

FIG. 2 is a diagram of a method 200 for system support replication, according to an example embodiment. The software module(s) that implements the method 200 is referred to as a "replica synchronizer." The replica synchronizer is implemented as executable instructions programmed and residing within memory and/or a non-transitory computer-readable (processor-readable) storage medium and executed by one or more processors of a device. The processor(s) of the device that executes the replica synchronizer are specifically configured and programmed to process the replica synchronizer. The replica synchronizer has access to one or more network connections during its processing. The network connections can be wired, wireless, or a combination of wired and wireless.

In an embodiment, the device that executes the replica synchronizer is an enterprise server. In an embodiment the enterprise server is the server 110.

In an embodiment, the replica synchronizer is the management agent 111 and the configuration interface 112.

The replica synchronizer interacts with the replicator 122 over a network connection. Processing associated with the replicator 122 was discussed above with the FIG. 1 and is further discussed below with reference to the FIGS. 3-4.

At 210, the replica synchronizer provides a configuration interface within a processing environment where enterprise services are being provided within an enterprise system. In an embodiment, the configuration interface is the configuration interface 112.

At 220, the replica synchronizer receives custom-data synchronization selections for an enterprise system from the configuration interface. These are data asset selections representing which data assets an enterprise desires to share with a VM replica being maintained by a portal for the enterprise system and enterprise services.

In an embodiment, at 221, the replica synchronizer generates a list of data assets associated with the enterprise system. The replica synchronizer provides the list for viewing and selection by enterprise personnel interacting with the configuration interface.

In an embodiment, at 222, the replica synchronizer pre-selects some of the data assets presented in the list by default within the configuration interface (such as system settings for software resources, system logs, and items identified above in the discussion of the FIG. 1).

At 230, the replica synchronizer sends replica data for the enterprise system that comports with the custom-data synchronization selections to a portal over a network connection. In an embodiment, the portal executes the replicator 122 and/or the method 300 (discussed below).

In an embodiment, at 231, the replica synchronizer sends the replica data as image data for a processing environment of the enterprise system. The image data includes customizations of data assets provided within the configuration interface that comports with the custom-data synchronization settings.

At 240, the replica synchronizer maintains synchronization between the enterprise system with the portal during operation of the enterprise system and the enterprise services processing within the processing environment of the enterprise system.

In an embodiment of 231 and 240, at 241, the replica synchronizer sends any processing environment changes and data asset configurations to the portal during operation of the enterprise system.

In an embodiment, 250, the replica synchronizer is initiated within the processing environment of the enterprise system during an install of the enterprise services on an enterprise server.

In an embodiment, at 260, the replica synchronizer receives a re-synchronization request from the portal and responsive thereto performs the processing at 230 a second time.

In an embodiment, at 270, the replica synchronizer receives a re-synchronization request from the configuration interface and responsive thereto performs the processing at 230 a second time.

In an embodiment, at 280, the replica synchronizer presents a VM identifier for a VM being maintained on the portal for the enterprise system along with a version and data of creation for the VM within the configuration interface. The VM is a custom-replica of the enterprise processing environment based on the custom-data synchronization selections.

Figure 3:
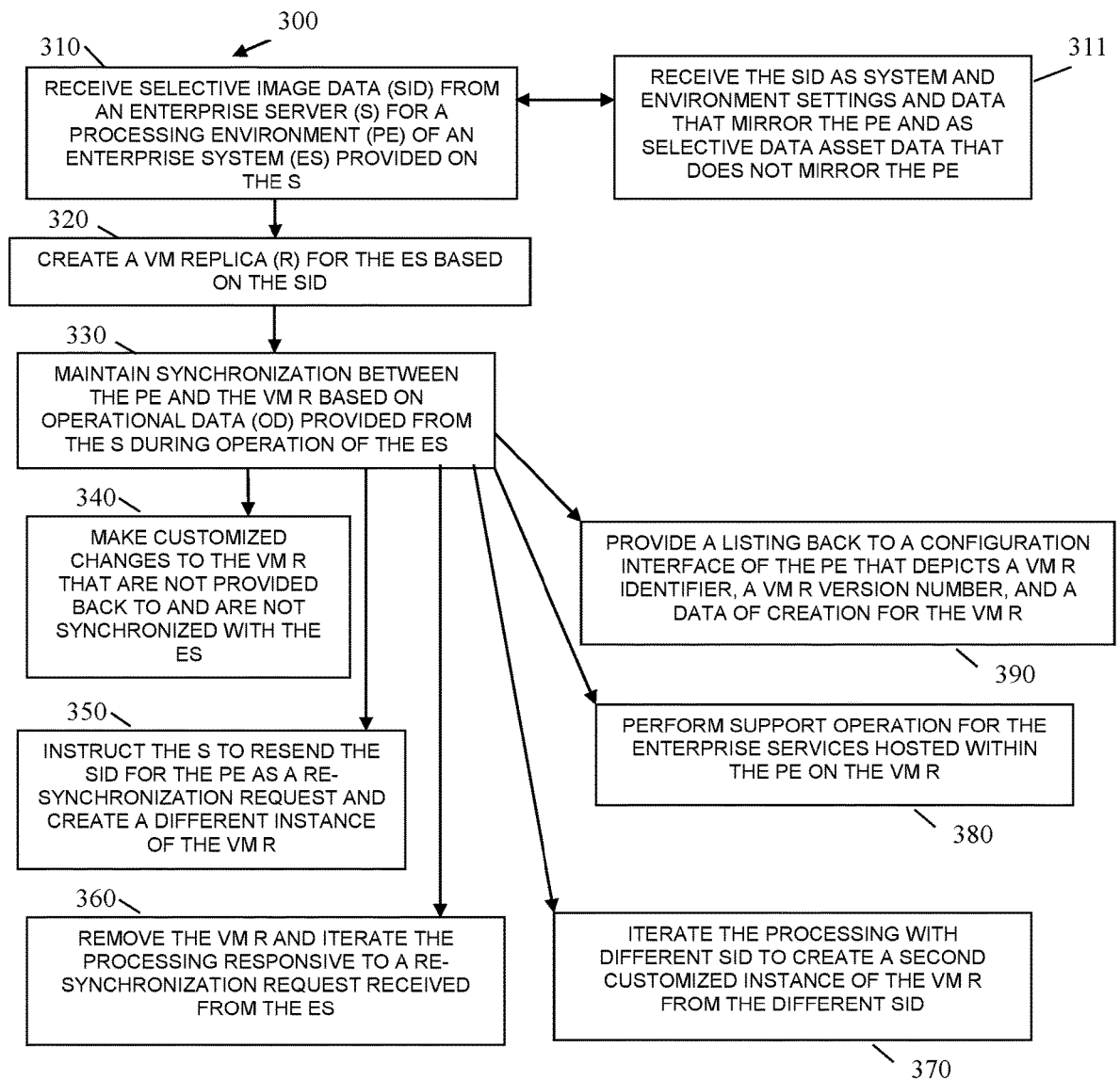
FIG. 3 is a diagram of another method for system support replication, according to an example embodiment.

FIG. 3 is a diagram of another method 300 for system support replication, according to an example embodiment. The software module(s) that implements the method 300 is referred to as a "replicator." The replicator is implemented as executable instructions programmed and residing within memory and/or a non-transitory computer-readable (processor-readable) storage medium and executed by one or more processors of a device. The processors that execute the replicator are specifically configured and programmed to process the replicator. The replicator has access to one or more network connections during its processing. The network connections can be wired, wireless, or a combination of wired and wireless.

In an embodiment, the device that executes the replicator is a server. In an embodiment, the server is the network portal 120.

In an embodiment, the replicator is the replicator 122.

The replicator interacts over a network connection with the management agent 111, the configuration interface 112, and/or the method 200.

At 310, the replicator receives selective image data from an enterprise server for a processing environment of an enterprise system provided on the enterprise server. The processing environment is where enterprise services for an enterprise are being hosted.

In an embodiment, at 311, the replicator receives the selective image data as system and environment settings and data that mirror the processing environment and as selective data assets data that does not mirror the processing environment.

At 320, the replicator creates a VM replica for the enterprise system based on the selective image data.

At 330, the replicator maintains synchronization between the processing environment and the VM replica based on operational data provided from the enterprise server during operation of the enterprise system.

In an embodiment, at 340, the replicator makes customized changes to the VM replica that are not provided back to and are not synchronized with the enterprise system.

In an embodiment, at 350, the replicator instructs the server to resend the selective image data for the processing environment as a re-synchronization request. In response to the new and updated received selective image data, the replicator creates a different instance of the VM replica.

In an embodiment, at 360, the replicator removes the VM replica and iterates back to 310 responsive to a received re-synchronization request received from the enterprise system.

In an embodiment, at 370, the replicator iterates the processing back at 310 with a different set of selective image data to create a second instance of the VM replica from the different set of selective image data.

In an embodiment, at 380, the replicator performs support operations for the enterprise services hosted within the enterprise system on the VM replica. The support operations are not replicated back from the replicator to the enterprise system of the enterprise server.

In an embodiment, at 390, the replicator provides a listing back to a configuration interface of the processing environment that depicts a VM replica identifier, a VM version number, and a data of creation for the VM replica.

Figure 4:
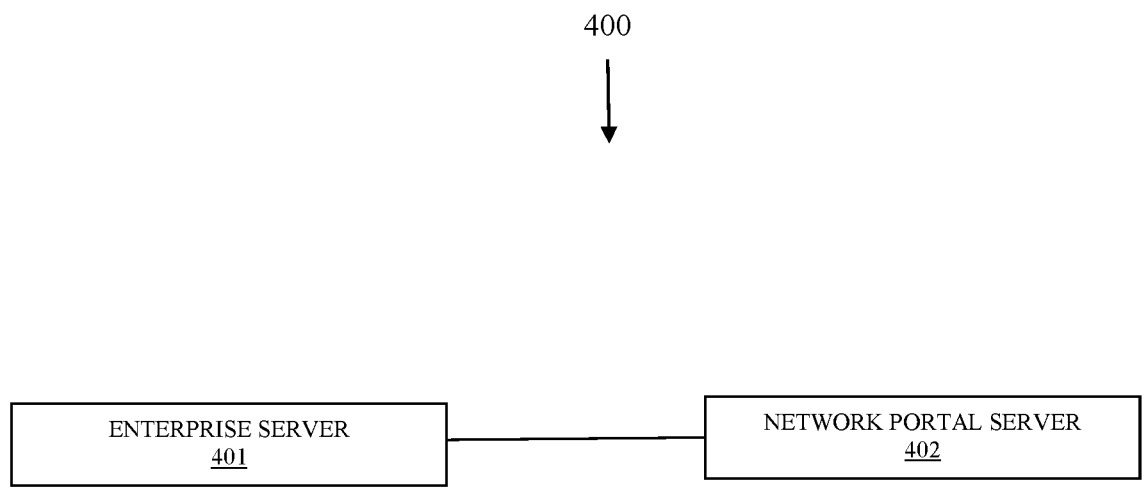
FIG. 4 is a diagram of another system for system support replication, according to an example embodiment.

FIG. 4 is a diagram of a system 400 for system support replication, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes an enterprise server 401 and a network-portal server 402.

In an embodiment, processing performed by the enterprise server 401 is all of or some combination of the processing described above for the management agent 111 and/or the method 200.

In an embodiment, the processing performed by the network-portal server 402 is all of or some combination of the processing described above for the replicator 122 and/the method 300.

The enterprise server 401 hosts enterprise services for an enterprise system 113.

In an embodiment, the network-based portal server 402 is a server or a cloud-based server.

The enterprises server 401 includes at least one hardware processor that is configured to execute executable instructions from a non-transitory computer-readable storage medium, the executable instructions representing the management agent 111 and/or the method 200.

The network-portal server 402 includes at least one hardware processor that is configured to execute executable instructions from a non-transitory computer-readable storage medium, the executable instructions representing the replicator and/or the method 300.

The enterprise server 401 is configured to: i) receive selective configurations for data assets of an enterprise system; ii) send image data for a processing environment hosted in the enterprise server that comports with the selective configurations to the network portal server 402, and iii) send operational data during operation of the enterprise system within the processing environment to the network portal server 402 to maintain synchronization between the enterprise system and the network portal server 402.

The network portal server 402 is configured to: i) create a virtual machine (VM) replica from the image data received from the enterprise server 401 and ii) maintain synchronization within the VM replica to the enterprise system based on the operational data received from the enterprise server 402.

In an embodiment, enterprise server 401 is further configured to: iv) provide a configuration interface to identify the selective configurations. In an embodiment, the configuration interface is the configuration interface 112.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for maintaining synchronization between an enterprise system and a remote service support portal, comprising:
   providing executable instructions to a processor of a server from a non-transitory computer-readable storage medium, causing the processor to perform operations comprising:
   providing a configuration interface to a support person;
   receiving custom-data synchronization selections for the enterprise system from the configuration interface operated by the support person;
   sending replica data for the enterprise system that comports with the custom-data synchronization selections to the remote service support portal over a network connection, wherein sending further includes sending the replica data that comports with the custom-data synchronization selections as an accurate view of the enterprise system by identifying data assets comprised in a processing environment of the enterprise system but is not a true view of the processing environment because at least some of the data assets are comprised of dummy or faked data, and wherein sending further includes sending the replica data as image data for the processing environment of the enterprise system and including in the image data customizations of the data assets provided within the processing environment that comports with the custom-data synchronization selections; and maintaining synchronization between the enterprise system with the remote service support portal during operation of the enterprise system within a Virtual Machine (VM) instance managed by the remote service support portal, wherein maintaining further includes maintaining synchronization between the enterprise system and multiple different VM instances managed by the remote service support portal, each multiple different VM instance comprises a different degree or a different level of sharing of the data assets with different dummy or different faked data corresponding to select portions of the data assets that are not being shared.

2. The method of claim 1 further comprising, initiating processing for the method during an install of the enterprise system on an enterprise server.

3. The method of claim 1 further comprising, receiving a re-synchronization request from the remote service support portal and responsive thereto performing the sending a second time.

4. The method of claim 1 further comprising, receiving a re-synchronization request from the configuration interface and responsive thereto performing the sending a second time.

5. The method of claim 1 further comprising, presenting a VM identifier for the VM instance being maintained on the remote service support portal for the enterprise system along with a version and a date of creation for the VM instance within the configuration interface and presenting other VM identifiers corresponding to the multiple different VM instances along with corresponding versions and dates of creation for the multiple different VM instances.

6. The method of claim 1, wherein receiving further includes generating a list of the data assets associated with the processing environment of the enterprise system and providing the list for viewing and selecting within the configuration interface.

7. The method of claim 6, wherein generating further includes preselecting some of the data assets presented in the list by default within the configuration interface.

8. The method of claim 7, wherein preselecting further includes deselecting the preselected data assets based on the custom-data synchronization selections.

9. The method of claim 1, wherein maintaining further includes sending any processing environment changes and data asset changes to the remote service support portal during operation of the enterprise system.

10. A method for maintaining synchronization between a processing environment of an enterprise system and virtual machine (VM) replicas, comprising:
providing executable instructions to a processor of a network portal server from a non-transitory computer-readable storage medium, causing the processor to perform operations comprising:
receiving selective image data from an enterprise server for a processing environment of the enterprise system provided on the enterprise server, wherein receiving further includes receiving the selective image data as system and environmental settings and data that mirror the processing environment and as selective data asset data that does not mirror the processing environment;
creating a VM replica for the processing environment of the enterprise system based on the selective image data, wherein creating further includes creating the VM replica as an accurate view of the processing environment for the enterprise system that identifies data assets for the processing environment but not a true view of the processing environment because at least some of the data assets of the VM replica is comprised of dummy or faked data; and
maintaining synchronization between the processing environment of the enterprise system and the VM replica in the network portal server based on operational data provided from the enterprise server during operation of the enterprise system, wherein maintaining further includes maintaining synchronization between the processing environment and multiple instances of additional VM replicas, each instance comprises a different degree or a different level of sharing of the data assets with different dummy or different faked data corresponding to select portions of the data assets that are not being shared.

11. The method of claim 10 further comprising, making customized changes to the VM replica that are not provided back to and are not synchronized with the enterprise system.

12. The method of claim 10 further comprising, instructing the enterprise server to resend the selective image data for the processing environment as a re-synchronization request and creating a different instance of the VM replica.

13. The method of claim 10 further comprising, removing the VM replica and iterating the method responsive to a re-synchronization request received from the enterprise server.

14. The method of claim 10 further comprising, iterating the method with different selective image data to create a second customized instance of the VM replica from the different selective image data.

15. The method of claim 10 further comprising, performing support operations for enterprise services hosted within the processing environment on the VM replica.

16. The method of claim 10 further comprising, providing a listing back to a configuration interface of the processing environment that depicts a VM replica identifier, a VM replica version number, and a date of creation of the VM replica, an additional VM replica identifier for each of the multiple instances of the additional VM replicas, an additional VM replica version number for each of the multiple instances of the additional VM replicas, and an additional date of creation corresponding to each of the multiple instances of the additional VM replicas.

17. A system for maintaining synchronization between an enterprise system and a network portal server, comprising:
an enterprise server comprising an enterprise server processor and an enterprise non-transitory computer-readable storage medium comprising enterprise executable instructions;
the network portal server comprising a portal processor and a portal non-transitory computer-readable storage medium comprising portal executable instructions;

the enterprise executable instructions executed by the enterprise processor from the enterprise non-transitory computer-readable storage medium causing the enterprise processor to perform first operations comprising:
  receiving selective configurations for data assets of the enterprise system;
  sending image data for a processing environment hosted in the enterprise server that comports with the selective configurations to the network portal server, wherein the image data comprises an accurate view of data assets for the processing environment but not a true view of the processing environment because at least some of the data assets in the image data are comprised of dummy or faked data in the image data based on the selective configurations, wherein the image data includes customizations of the data assets provided within the processing environment; and
  sending operational data during operation of the enterprise system within the processing environment to the network portal server to maintain synchronization between the enterprise system and the network portal server; and
the portal executable instructions executed by the portal processor from the portal non-transitory computer-readable storage medium causing the portal processor to perform second operations comprising:
  receiving the image data from the enterprise server for the processing environment of the enterprise system, wherein receiving includes receiving selective image data as system and environmental settings and data that mirror the processing environment and as selective data asset data that does not mirror the processing environment;
  creating a virtual machine (VM) replica from the image data received from the enterprise server;
  maintaining synchronization within the VM replica to the enterprise system based on the operational data received from the enterprise server; and
  maintaining synchronization between the processing environment and multiple different VM replica instances managed by the portal executable instructions each multiple different VM replica instance comprises a different degree or a different level of sharing of the data assets with different dummy or different faked data corresponding to select portions of the data assets that are not being shared.

18. The system of claim 17, wherein the enterprise server is further configured to: provide a configuration interface to identify the selective configurations.

* * * * *